(12) United States Patent  (10) Patent No.: US 8,073,302 B2
Allen et al.  (45) Date of Patent: Dec. 6, 2011

(54) TELECOMMUNICATION ENCLOSURE WITH AN INTERLOCKING SEAL

(75) Inventors: William G. Allen, Austin, TX (US); Rutesh D. Parikh, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 155 days.

(21) Appl. No.: 12/625,643

(22) Filed: Nov. 25, 2009

(65) Prior Publication Data

US 2010/0150517 A1  Jun. 17, 2010

Related U.S. Application Data

(60) Provisional application No. 61/138,278, filed on Dec. 17, 2008.

(51) Int. Cl.
G02B 6/00 (2006.01)
H05K 5/06 (2006.01)

(52) U.S. Cl. ............... 385/135; 385/94; 174/50.5

(58) Field of Classification Search ............ 385/75, 385/76, 92, 94, 134–137; 174/50.5
See application file for complete search history.

(56) References Cited

U.S. PATENT DOCUMENTS

| | | | |
|---|---|---|---|
| 6,269,214 B1 * | 7/2001 | Naudin et al. | 385/135 |
| 6,300,562 B1 * | 10/2001 | Daoud | 174/50 |
| 6,487,344 B1 | 11/2002 | Naudin et al. | |
| 6,573,455 B1 * | 6/2003 | Radelet | 174/92 |
| 6,648,520 B2 | 11/2003 | McDonald et al. | |
| 6,691,667 B2 * | 2/2004 | Salameh | 123/195 C |
| 6,863,039 B2 * | 3/2005 | Salameh | 123/90.38 |
| 7,489,849 B2 * | 2/2009 | Reagan et al. | 385/135 |
| 7,702,208 B2 * | 4/2010 | Mudd et al. | 385/135 |
| 2005/0276562 A1 * | 12/2005 | Battey et al. | 385/135 |
| 2007/0095849 A1 * | 5/2007 | Kim | 220/803 |
| 2009/0060421 A1 | 3/2009 | Parikh et al. | |

FOREIGN PATENT DOCUMENTS

FR 2770048 A1 4/1999

* cited by examiner

*Primary Examiner* — Daniel Petkovsek
(74) *Attorney, Agent, or Firm* — Janet A. Kling

(57) ABSTRACT

In one aspect, the invention described herein provides an enclosure for containing telecommunication lines and/or telecommunication line splices therein. In one embodiment, the enclosure comprises a housing wherein the housing is removeably securable to the base. The base includes an edge wall extending from the bottom plate of the base. A sealing member is disposed on an outer surface of the edge wall. The housing includes an outer side wall and an inner lip spaced apart from the outer side wall. When the housing is secured to the base, the edge wall of the base is inserted between the outer side wall and the inner lip.

5 Claims, 2 Drawing Sheets

TELECOMMUNICATION ENCLOSURE WITH AN INTERLOCKING SEAL

CROSS REFERENCE TO RELATED APPLICATION

This application claims the benefit of U.S. Provisional Patent Application No. 61/138,278, filed Dec. 17, 2008, the disclosure of which is incorporated by reference herein in its entirety.

FIELD OF THE INVENTION

The present invention relates generally to enclosures having an interlocking seal for telecommunications cables. More particularly, the invention relates to enclosures for containing telecommunication lines and telecommunication line splices.

BACKGROUND OF THE INVENTION

Telecommunication cables are ubiquitous and used for distributing all manner of data across vast networks. The majority of cables are electrically conductive cables (typically copper), although the use of optical fiber cable is growing rapidly in telecommunication systems as larger and larger amounts of data are transmitted. Additionally, as data transmissions increase, the fiber optic network is being extended closer to the end user which can be a premise, business, or a private residence.

As telecommunication cables are routed across data networks, it is necessary to periodically open the cable so that one or more telecommunication lines therein may be spliced, thereby allowing data to be distributed to other cables or "branches" of the telecommunication network. At each point where a telecommunication cable is opened, it is necessary to provide a telecommunications enclosure to protect the exposed interior of the cable. The cable branches may be further distributed until the network reaches individual homes, businesses, offices, and so on. These networks are often referred to as fiber to the premises (FTTP) or fiber to the home (FTTH) networks.

Commonly, the enclosure has one or more ports through which cables enter and/or exit the enclosure. Once inside the enclosure, the cable is opened to expose the telecommunication lines therein. Conventional telecommunication enclosures are constructed to facilitate the management and protection of individual telecommunication lines and splices thereof. For example, conventional enclosures have re-enterable housings and are designed to incorporate splice trays to assist a craftsman in creating a splice connection between two telecommunication lines. Once all required splices are made, the enclosure is secured to protect the opened portion of the cable from moisture, dust, insects, and other hazards.

After an enclosure is closed and secured, it must satisfy several technical performance requirements to ensure reliable protection of the opened portion of the cable and various other electronic or optical components within the enclosure. For example, the enclosure must satisfy various environmental related requirements, such as corrosion, insect resistance, and water resistance. Molded polymer enclosures are generally preferred, as they most easily satisfy the environmental requirements, in addition to being more easily produced. However, harsh environmental conditions may cause shifting, movement or distortion of one or more parts or portions of a telecommunication enclosure which can result in a change in the relative position of the housing with respect to the base. If this change in position is sufficient to affect the seal between the base and the housing, the telecommunication enclosure will be compromised which could interrupt the communication network.

SUMMARY OF THE INVENTION

In one aspect, the invention described herein provides an enclosure for containing telecommunication lines and telecommunication line splices therein. In one embodiment, the enclosure comprises a housing wherein the housing is removeably securable to the base. The base includes an edge wall extending from the bottom plate of the base. A sealing member is disposed on an outer surface of the edge wall. The housing includes an outer side wall and an inner lip spaced apart from the outer side wall. When the housing is secured to the base, the edge wall of the base is inserted between the outer side wall and the inner lip of the housing.

Trapping the edge wall of the base including the sealing member between the outer side wall and the inner lip of the housing provides an improved environmental seal for the telecommunication enclosure.

BRIEF DESCRIPTION OF THE DRAWINGS

The present invention will be further described with reference to the accompanying drawings, wherein.

Figure 1:
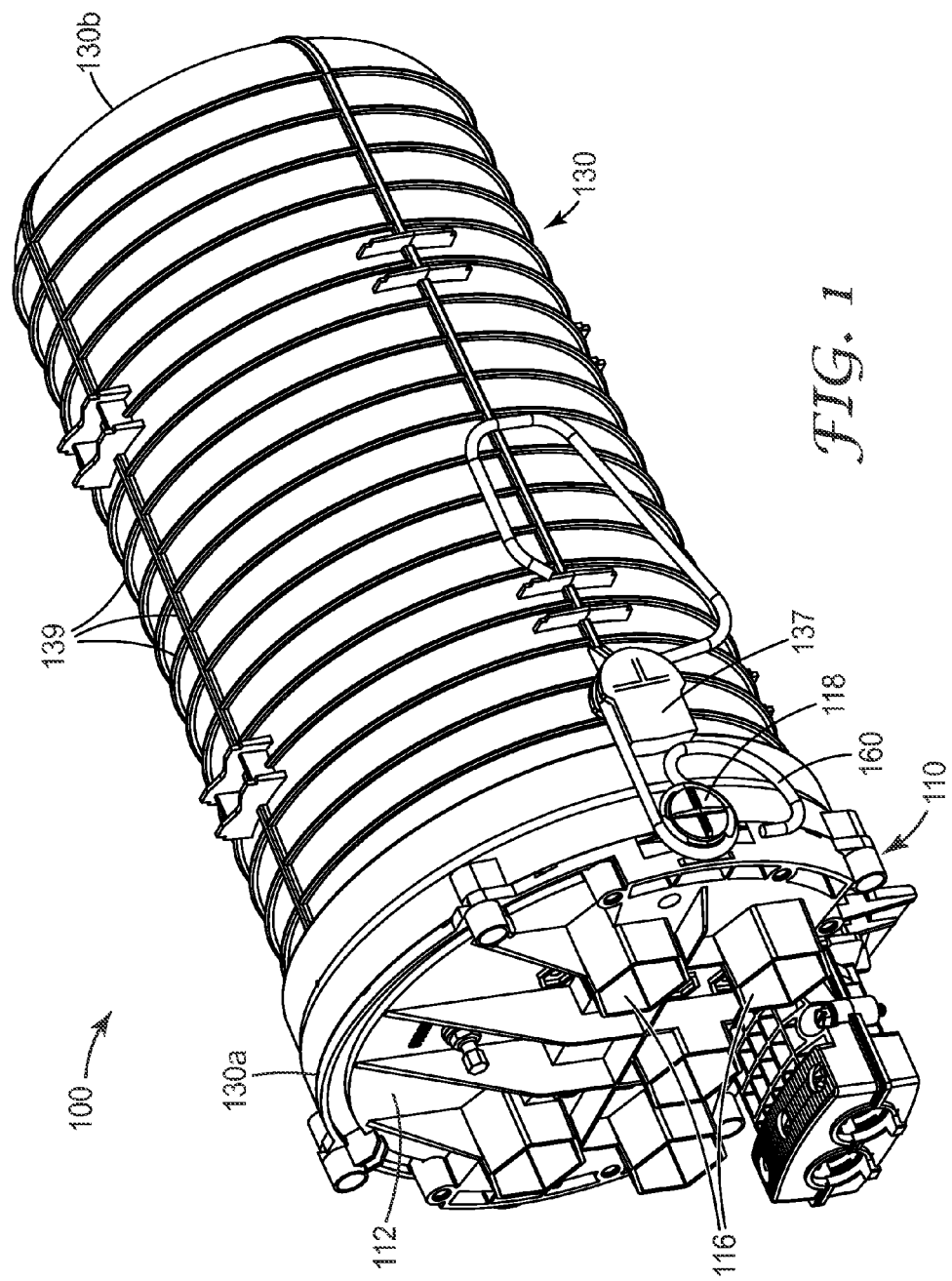
FIG. 1 shows an assembled isometric view of a telecommunication enclosure according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE DRAWINGS

In the following detailed description of the preferred embodiments, reference is made to the accompanying drawings, which form a part hereof, and in which is shown by way of illustration specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

For purposes of clarity, the invention is described herein as used with telecommunication cables or simply "cables" having one or more telecommunication lines therein. However, such use is exemplary only, and it is understood and intended that the present invention is equally suitable for use with other types of cables including, but not limited to, electrical power cables, optical fiber cables, copper wire cables, coaxial cables, drop lines, branch lines, and distribution lines, to name a few. Similarly, the invention is described herein as used with telecommunication line splices, or simply "splices". However, such use is exemplary only, and it is understood and intended that the present invention is equally suitable for use with other types of interconnections including, but not limited to, splices, connectors, hybrid connectors, and optical or electrical components as are known in the art, to name a few.

Figure 2:
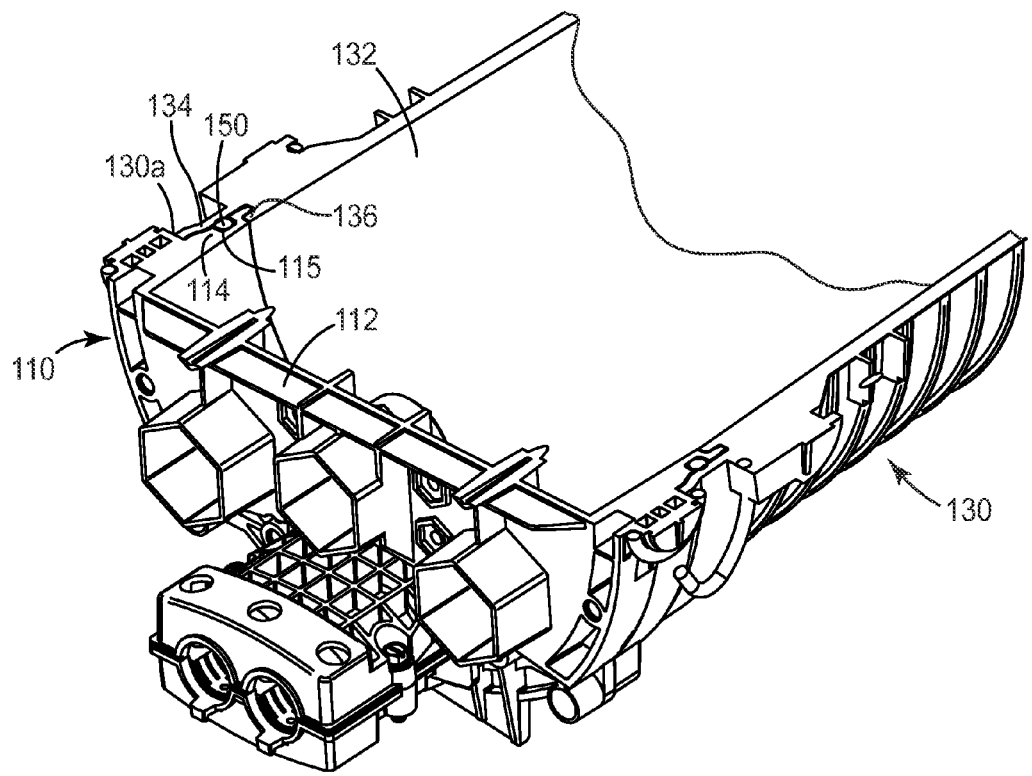
FIG. 2 shows a cross-sectional view of the telecommunication enclosure of FIG. 1.
Figure 3:
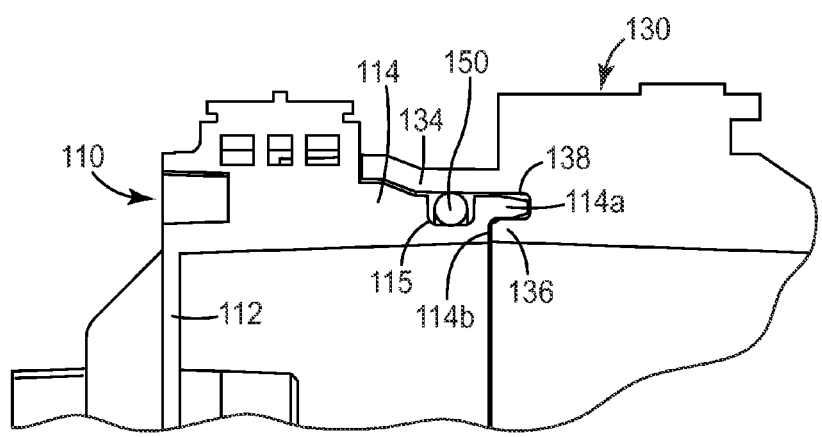
FIG. 3 shows a detailed view of the interlocking seal of the telecommunication enclosure of FIG. 2.

Referring to FIGS. 1-3, an exemplary enclosure 100 according to one embodiment of the invention is illustrated. The enclosure 100 includes a base 110 and a housing 130 removeably securable to the base.

The base 110 includes a bottom plate 112 and an edge wall 114 extending generally perpendicularly from and around the circumference of the bottom plate. The edge wall can have a channel 115 formed in its outer surface to accommodate a sealing member 150, such as an o-ring or other resilient gasket. The sealing member 150 can provide an environmental seal between the base 110 and the housing 130 when the housing is secured to the base.

The edge wall 114 can also include a thinned section 114a that projects along the top outer circumference of the edge wall and shoulder 114b along its interior surface near the top surface adjacent to the thinned section. The thinned section 114a and shoulder 114b mate with features in the housing, which are described in detail below, to provide an interlocking seal between the base and the housing when they are assembled together.

Additionally, the base 110 can include at least one port 116 for receiving a telecommunications cable (not shown) disposed within the bottom plate. The ports 116 allow passage of a single cable, or multiple cables in combination with a sealing member as is known in the art. The base 110 may have one, two, or any other number ports 116 as is required for a particular enclosure 100.

The housing 130 is hollow and defines a longitudinal internal cavity 132 extending from a first end 130a to a closed second end 130b of the housing 130. The internal cavity 132 has a circumferential shape in a direction transverse to the longitudinal direction. An opening at the first end 130a of the housing 130 is shaped and sized to fit over and engage with the base 110 in a conventional manner. When engaged, the base 110 and housing 130 provide protection for the internal components of the enclosure 100 from weather, insects and other external hazards.

To enhance the sealing capability of the telecommunication enclosure, the housing's opening comprises an outer wall 134 and an inner lip 136 spaced apart from the outer wall and generally parallel with the outer wall to form a pocket 138 between the outer wall and the inner lip. The outer wall 134 of the housing fits down over the edge wall 114 of the base 110 to compress the sealing member 150 between the edge wall and the inner surface of the outer wall. The thinned section 114a of the edge wall 114 fits snugly in the pocket 138 between the inside surface of the outer wall 134 and the inner lip 136 of the housing. When fully seated, the inner lip of the housing rests against the shoulder near the top of the edge wall. Thus, the edge wall of the base is locked between the outer wall and the inner lip of the housing. This interlocking seal structure stabilizes the seal of the telecommunication enclosure by maintaining constant compression of the sealing member between the base and the housing. Further, this interlocking seal structure can be used to hermetically seal the base and the housing together.

In each of the embodiments and implementations described herein, the various components of the enclosure are formed of a suitable material. In one embodiment, the base 110 and housing 130 are formed of polymeric materials by methods such as injection molding, extrusion, casting, machining, and the like. Material selection will depend upon factors including, but not limited to, chemical exposure conditions, environmental exposure conditions including temperature and humidity conditions, flame-retardancy requirements, material strength, and rigidity, to name a few.

In the exemplary embodiment shown in FIG. 1, the housing 130 and cavity 132 (FIG. 2) therein are substantially circular in transverse cross-section, and the closed second end 130b of the housing 130 is substantially dome-shaped. The base 110 has a substantially circular cross-section in the transverse direction that matches the shape of the open end of the housing 130. However, in practice, the shapes of the base 110 and housing 130 are not so limited, and in other embodiments the housing 130 and base 110 may have other shapes and cross-sections. For example, shape of the transverse cross-section of the housing 130 and base 110 may be substantially oval, rectangular, square, or any other shape as is required or desired for a particular application. The closed second end 130b of the housing 130 may likewise be any suitable shape. In other embodiments, the closed second end 130b of the housing 130 is not monolithically formed with the remainder of the housing 130, as shown in the illustrated embodiment. For example, in other embodiments the housing 130 may comprise an assembly of components, such as a longitudinal hollow body having two open ends, wherein a cap or other similar device is used to form the closed second end 130b. In one embodiment, the housing 130 may include internal or external rib members, such as external rib members 139, to increase the strength of the housing to meet external pressure requirements.

A latch may be used to lock the housing to the base when in an assembled state. The latch may be pivotally attached to one of the housing or the base and free to engage with a catch member on the other of the base or the housing. In an exemplary embodiment as shown in FIG. 1, the latch 160 may be pivotally attached to an anchor 118 that extends from the base 110. After the housing 130 has been seated onto base 110, the latch 160 can be rotated around until the latch engages with a catch member 137 located on the outer surface of the housing, thus locking the housing to the base. In an exemplary embodiment, two latches may be positioned on opposing sides of the housing to ensure the housing is securely locked to the base.

The telecommunication cables may be introduced into the telecommunication enclosure using known port entry devices such as are described in U.S. Pat. Nos. 6,487,344 and 6,648,520 as well as in U.S. Publication No. 2009-0060421 A1, for example.

While the interlocking seal of the current invention has been described with respect to its installation in a butt-style telecommunication enclosure system, the interlocking seal may be used in conjunction with other conventional telecommunication enclosure, closures, terminals, cabinets, optical network units, and other telecommunication junction boxes.

Various modifications extending the use of the port entry device to other telecommunication enclosures or other telecommunication network designs, as well as numerous structures to which the present invention may be applicable will be readily apparent to those of skill in the art to which the present invention is directed upon review of the present specification.

The invention claimed is:

1. A telecommunication enclosure with an interlocking seal, the telecommunication enclosure comprising:
 a base including an edge wall extending from the bottom plate of the base;
 a sealing member disposed on an outer surface of the edge wall, wherein the sealing member is disposed within a channel formed in the outer surface of the edge wall; and a housing wherein the housing is removeably securable to the base, the housing includes an outer side wall and an inner lip spaced apart from the outer side wall, wherein the edge wall of the base is disposed in a pocket between the outer side wall and the inner lip when the housing is hermetically secured to the base.

2. The telecommunication enclosure of claim 1, further comprising at least one port disposed in the bottom plate of the base.

3. The telecommunication enclosure of claim 1, further comprising a latch that is pivotally attached to the base; the latch engages with a catch member on the cover to secure the base to the housing.

4. The telecommunication enclosure of claim 1, wherein the interlocking seal provides a hermetic seal.

5. The telecommunication enclosure of claim 1, where in the telecommunication enclosure is a butt-style enclosure.

* * * * *